Dec. 24, 1968   D. F. DE VORAK   3,417,926

SPREADER CHAIN AND FAN DRIVE ASSEMBLY

Filed Aug. 5, 1966   3 Sheets-Sheet 1

Dwight F. DeVorak
INVENTOR.

BY
*Attorneys*

Dec. 24, 1968  D. F. DE VORAK  3,417,926
SPREADER CHAIN AND FAN DRIVE ASSEMBLY
Filed Aug. 5, 1966  3 Sheets-Sheet 2
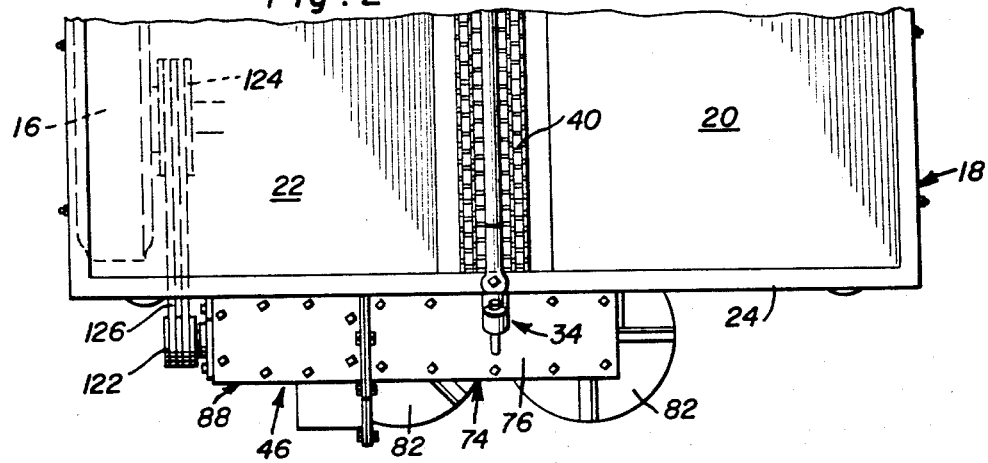
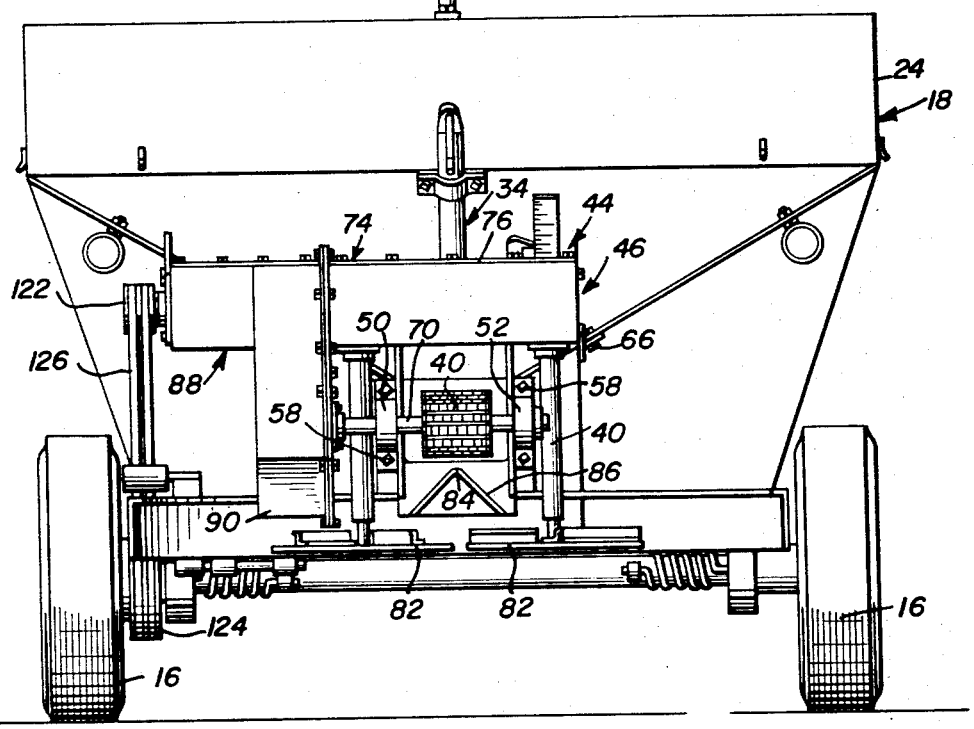
Dwight F. DeVorak
INVENTOR.

Dec. 24, 1968    D. F. DE VORAK    3,417,926

SPREADER CHAIN AND FAN DRIVE ASSEMBLY

Filed Aug. 5, 1966    3 Sheets-Sheet 3

Dwight F. DeVorak
INVENTOR.

BY *Clarence A. O'Brien*
*and Harvey B. Jackson*
Attorneys

United States Patent Office 3,417,926
Patented Dec. 24, 1968

3,417,926
SPREADER CHAIN AND FAN
DRIVE ASSEMBLY
Dwight F. De Vorak, Crowley St.,
Hazen, Ark. 72064
Filed Aug. 5, 1966, Ser. No. 570,569
2 Claims. (Cl. 239—673)

ABSTRACT OF THE DISCLOSURE

A wheeled material spreader including an elongated longitudinally extending hopper provided with a lower material outlet opening at its rear end and including a longitudinally extending conveyor in the bottom of the hopper registered with the outlet opening. A spreader fan and conveyor drive assembly is removably supported from the rear end of the hopper and driven from one of the ground engaging wheels of the material spreader. The drive assembly includes an upper transverse shaft driven from the wheels of the spreader and which is disposed exteriorly of the hopper above the outlet opening thereof. A pair of upstanding journalled spreader fan shafts are journalled from the drive assembly, driven from the transverse shaft at their upper end and extend downwardly on opposite sides of the outlet opening. The conveyor is of the endless flexible belt type and a horizontal transverse drive shaft for the rear end of the conveyor is journalled from the drive assembly below the transverse shaft driving the spreader fan shaft and in registry with the outlet opening of the hopper and one end of the conveyor drive shaft is driven by the corresponding end of the spread fan drive shaft.

---

This invention relates to a novel and useful spreader chain and fan drive assembly and more specifically to a drag chain and fan drive unit for a mobile spreader of the type including ground engaging support wheels and a drive connection between at least one of the ground engaging support wheels and the spreader chain and fan drive assembly of the instant invention.

The assembly of the instant invention is adapted to be utilized in conjunction with a spreader of the type including a mobile hopper containing material to be broadcast over the ground and the material receiving portion of the hopper is generally V-shaped in configuration and has a drag chain-type conveyor operatively associated with the lower portion of the hopper for delivering material from the hopper to one end of the drag chain conveyor. After the material within the hopper has been delivered to one end of the drag chain conveyor, the material falls from the end of the drag chain conveyor onto a divider plate assembly which deflects the material onto a pair of spinning spreader fans or disks. The drag chain conveyor and spreader fans are driven from one of the ground engaging wheels of the spreader and it may of course be appreciated that the driving shaft for the drag chain is driven at a rotational speed considerably slower than the rotational speed of the shafts on which the spreader fans or disks are mounted. Accordingly, the drive shaft of the drive assembly of the instant invention is driven through a speed increasing driving connection from one of the ground engaging wheels of the spreader to the drive shaft, which driving connection is established by endless V-belt driving means. The driving shaft for the drag chain conveyor assembly is driven from the drive shaft through a speed reducing driving assembly and the spreader fan shafts are driven from the drive shaft through a speed increasing driving assembly. Therefore, the spreader fan shafts which shafts do not constitute a great load, are driven at greater rotational speeds than the driving shaft for the drag chain.

The main object of this invention is to provide a spreader chain and fan drive assembly for a spreader of the mobile type which will be dependable in operation and have a long life expectancy.

Another object of this invention, in accordance with the immediately preceding object, is to provide a housing for completely enclosing all meshed gears of the drive assembly of the instant invention and including gear lubricating sump portions having gear lubricant therein through which the peripheral portion of at least one gear of each pair of meshed gears is caused to move so as to maintain the various gears of the drive assembly fully lubricated at all times.

A final object of this invention to be specifically enumerated herein is to provide a spreader chain and fan drive assembly which will conform to conventional forms of manufacture, be of simple construction and automatic in operation so as to provide a device that will be economically feasible, long lasting and relatively trouble-free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a fragmentary top plan view of the rear portion of the assemblage illustrated in FIGURE 1;

FIGURE 3 is a rear elevational view of the assemblage illustrated in FIGURE 1;

Figure 1:
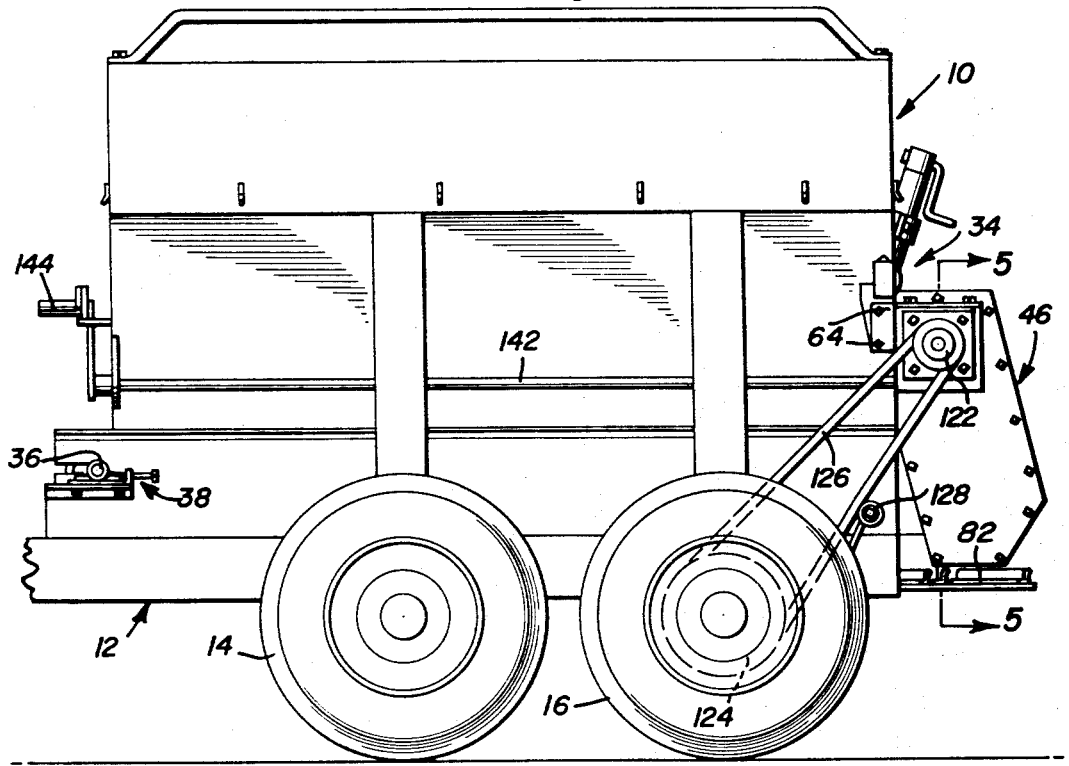
FIGURE 1 is a fragmentary side elevational view of a mobile type spreader with the spreader chain and fan drive assembly of the instant invention utilized to drive the spreader chain and spreader fans of the spreader from one of the ground engaging wheels of the spreader.
Figure 6:
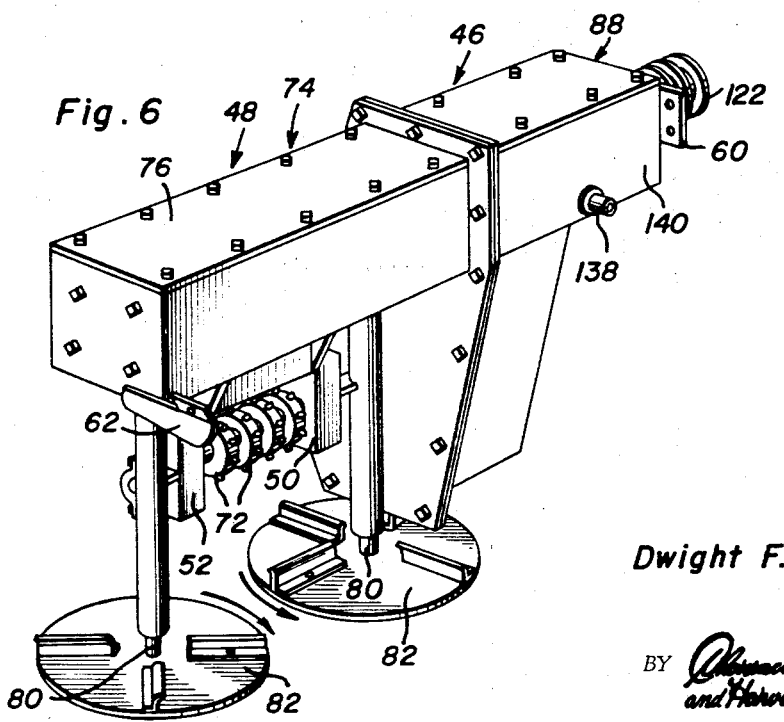
FIGURE 6 is a perspective view of the spreader chain and fan drive assembly.
Figure 4:
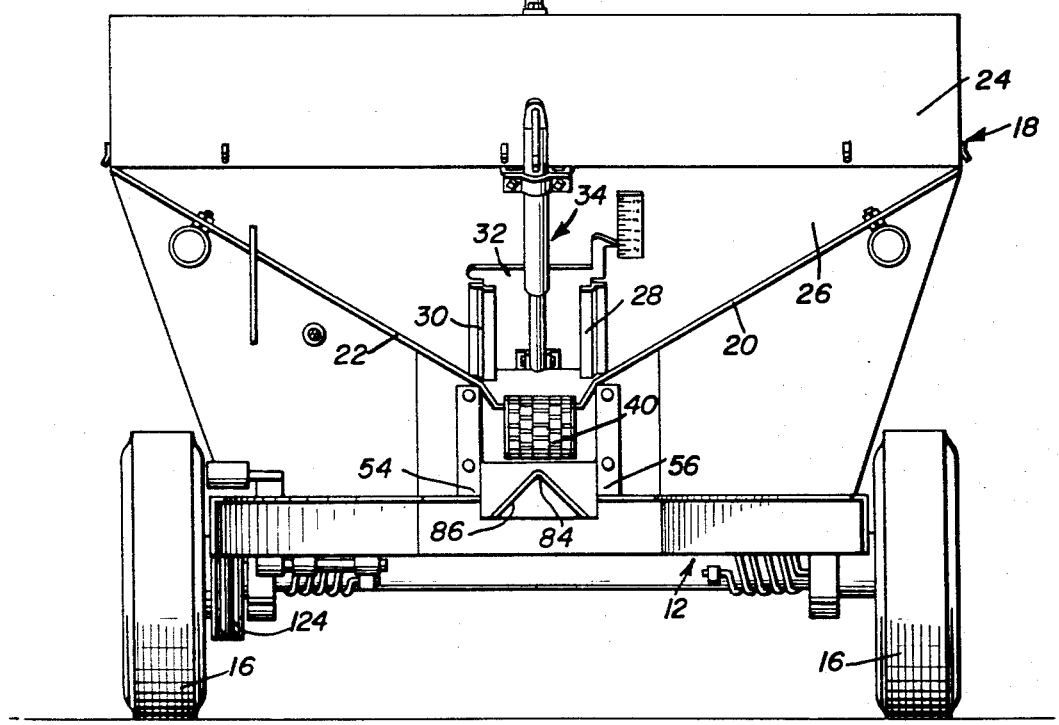
FIGURE 4 is a rear elevational view of the assemblage illustrated in FIGURE 1 shown with the spreader chain and fan drive assembly of the instant invention removed and the clutch actuating shaft for the drive assembly illustrated in transverse vertical section.
Figure 5:
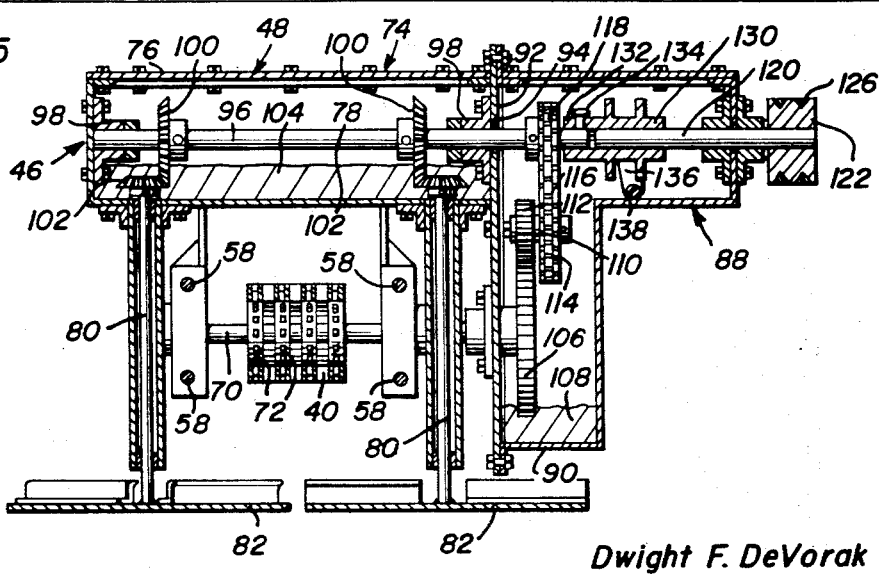
FIGURE 5 is an enlarged fragmentary transverse vertical sectional view taken substantially upon the plane indicated by the section line 5—5 of FIGURE 1.

Referring now more specifically to the drawings the numeral 10 generally designates a mobile spreader including a main frame generally referred to by the reference numeral 12 from which front and rear ground engaging support wheels 14 and 16 are journalled. In addition, a material receiving hopper generally referred to by the reference numeral 18 is supported from the frame 12 and includes downwardly convergent bottom wall portions 20 and 22 spaced apart at their lower ends to define a discharge slot.

The hopper 18 is provided with a rear wall 24 including a forwardly and downwardly inclined lower portion 26 in which a centrally disposed upstanding slot is formed in registry with the discharge slot, the upstanding slot being disposed between a pair of guides 28 and 30 carried by the lower portion 26 from which there is slidably supported a control gate 32 for varying the size of the slot in the lower portion 26. Further, a screw jack-actuator 34 is supported from the lower portion 26 and operatively connected to the control gate 32.

The forward end of the hopper 18 rotatably journals a transverse shaft 36 and includes means 38 by which the axis of rotation of the shaft 36 may be shifted longitudinally of the spreader 10. An endless drag chain 40 has its forward end entrained about the shaft 36 and the upper reach of the chain 40 defines a bottom for the slot defined between the lower ends of the bottom wall portions 20 and 22 and a moving conveyor for conveying material within the hopper 18 outwardly of the rear end of the hopper, the control gate 32 being operable to control the vertical thickness of the layer of material being conveyed to the rear of the hopper 18 and outwardly through the vertical slot by means of the chain 40.

The spreader chain and fan drive assembly of the instant invention is generally referred to by the reference numeral 46 and includes a housing structure generally referred to by the reference numeral 48 supported from the rear end of the hopper 18 by means of a plurality of journal blocks 50 and 52 supported therefrom and secured to mounting flanges 54 and 56 carried by the hopper 18, fasteners 58 being secured through the mounting flanges 54 and 56 and the journal blocks 50 and 52. In addition, the housing structure 48 includes a plurality of apertured mounting flanges 60 and 62 which are secured to the hopper 18 by means of suitable fasteners 64 and 66.

A second spreader drive chain shaft 70 is journalled in the journal blocks 50 and 52 and includes sprocket wheels 72 mounted thereon in driving engagement with the rear end of the endless chain 40 which is entrained thereover.

The housing structure 48 includes an upper horizontal portion generally referred to by the reference numeral 74 provided with a removable top plate 76 and through whose bottom wall 78 the upper ends of a plurality of spreader fan supporting shafts 80 are rotatably journalled. The lower ends of the shafts 80 have a pair of spreader fans 82 mounted thereon and it may be seen that the fans 82 are spaced transversely of the hopper 18 on opposite sides of a longitudinal upstanding plane passing along the center of the chain 40 and through the apex 84 of a divider plate or baffle 86 supported from the hopper 18 immediately below the rear end of the chain 40. Thus, as material conveyed rearwardly from the hopper 18 by the chain 40 falls off the rear end of the chain 40, the material strikes the divider or baffle plate 86 and is divided into separate streams of material directed toward the spreader fan disks 82.

The housing structure 48 also includes an upstanding housing section or portion generally referred to by the reference numeral 88 and including a bottom wall 90. In addition, a divider wall or partition 92 substantially fully closes the end of the upper portion 48 adjacent the upstanding section 88 but has a central aperture 94 therein through which a drive shaft 96 extends, the drive shaft 96 being journalled by bearing assemblies 98 disposed within the upper portion 48 and including spur gears 100 mounted thereon meshed with gears 102 mounted on the upper terminal end portions of the shafts 80 projecting into the upper portion 48 of the housing structure.

The lower end of the upper portion 49 of the housing structure 48 defines a lubricant sump in which lubricant 104 is disposed, the meshing portions of the gears 100 and 102 being disposed within the lubricant 104. In addition, the shaft 70 has one end portion which projects into the upstanding end portion 88 of the housing structure 48 and which has a large diameter gear wheel 106 mounted thereon. The lower portion of the upstanding end portion 88 of the housing structure 48 defines a second lubricant sump in which lubricant 108 immersing a lower peripheral portion of the gear 106 is disposed.

A lay shaft 110 is journalled in the upstanding end portion 88 of the housing structure 48 and has a gear wheel 112 on one end meshed with the gear wheel 106 and a sprocket wheel 114 on the other end driven from the shaft 96 by means of a chain 116 entrained thereabout and a gear wheel 118 mounted on the portion of the shaft 96 projecting through the partition 92 into the upstanding end portion 88 of the housing structure 48.

A driven shaft 120 is journalled in the upstanding end portion 88 and has one end portion which projects outwardly thereof and has a double sheave V-belt pulley 122 mounted thereon in alignment with a large diameter double V-belt pulley 124 supported from the left hand rear wheel 16 for rotation therewith. A pair of endless V-belts 124 are entrained about the aligned pulleys 122 and 124 pass over a tensioning pulley 128 adjustably supported from the frame 12.

The end of the driven shaft 120 remote from the pulley 122 is axially aligned with the end of the shaft 96 projecting through the opening or aperture 94 and has a slip sleeve 130 mounted thereon for rotation therewith provided with an axially opening notch 132 on its end adjacent the shaft 96 in which a generally radially extending pin 134 carried by the shaft 96 is receivable. The sleeve 130 is shiftable longitudinally of the shaft 120 and has an oscillatable shifting fork 136 operatively connected thereto, the shifting fork 136 being mounted on an oscillatable shaft 138 journalled through the front wall 140 of the upper portion 49 of the housing structure 48. The forward end of the shaft 138 is adapted for telescopic connection with an oscillatable operating shaft 142 supported from the hopper 18 and provided with an operating crank 144 at its forward end. Therefore, it may be seen that the operating crank 144 may be utilized to selectively drivingly connect the driven shaft 120 to the shaft 96. Further, it will be noted that the diameter of the pulley 124 is considerably greater than the pulley 122 and therefore that the shaft 120 will rotate at a speed considerably greater than the speed of rotation of the left rear wheel 16. Further, the gear wheels 110 are of greater diameter than the gear wheels 102 and therefore the shaft 88 will be rotated at a speed greater than the speed of rotation of the shaft 96. However, the shaft 70 is driven through a first speed reduction assembly defined by the sprocket wheels 114 and 118 and then through a second speed reduction assembly defined by the gear wheels 112 and 106 and therefore rotates at a speed considerably slower than the speed of rotation of the shaft 80.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. In combination with a material spreader of the type including an elongated longitudinally extending hopper provided with a lower material outlet opening at its rear end, journalled transverse shaft means disposed at the forward end of said hopper, an elongated endless flexible conveyor member entrained about said transverse shaft means at one end and extending lengthwise through the lower portion of said hopper with its other end registered with said outlet opening, a housing structure exteriorly and removably secured to the rear end of said hopper including an upper horizontal elongated portion extending transversely of said hopper above said outlet opening and defining a first closed chamber, drive shaft means journalled in said chamber and extending longitudinally of said upper horizontal portion of said housing structure, a pair of upstanding support shafts dependingly journalled from opposite end portions of said upper horizontal portion of said housing structure with said support shafts spaced on opposite sides of said outlet opening, a pair of generally horizontal spreader disks mounted on the lower ends of said support shafts below said outlet opening for rotation therewith, said support shafts projecting upwardly into said first closed chamber, first drive means in said first chamber drivingly connecting said drive shaft means to the upper ends of said support shafts, said housing structure including an upstanding portion disposed at one end portion of and depending from said upper horizontal portion and defining a second closed chamber separate from the first mentioned chamber, said drive shaft means including one end thereof extending through the upper end of said upstanding portion and projecting outwardly therefrom and adapted to have driving rotational torque applied thereto, a transverse drive shaft for said conveyor member about which the other end of said conveyor member is entrained with said drive shaft drivingly connected thereto, said drive shaft being journalled from said housing below said horizontal portion thereof with the end of said drive shaft corresponding to said one end of said drive shaft means projecting into the lower end of said upstanding portion of said housing structure below said one end of said drive shaft means, second drive means in said upstanding portion of said housing structure drivingly connecting said drive shaft means to said drive shaft, said first and second chambers defining lubricant chambers for receiving separate quantities of lubricant for lubricating said first and second drive means.

2. The combination of claim 1 wherein said spreader includes journalled support wheels, means drivingly connecting one of said support wheels to said one end of said drive shaft means.

References Cited

UNITED STATES PATENTS

| | | | |
|---|---|---|---|
| 995,905 | 6/1911 | Rice | 239—673 |
| 1,448,644 | 3/1923 | Wallace | 239—672 |
| 1,939,474 | 12/1933 | Van Houweling | 239—673 |
| 2,340,657 | 2/1944 | Goertzen | 239—673 |
| 2,442,743 | 6/1948 | Wester | 239—685 |
| 3,063,723 | 11/1962 | Toft | 239—672 |
| 3,065,822 | 11/1962 | McAfee et al. | 184—6 |

WALTER SOBIN, *Primary Examiner.*

U.S. Cl. X.R.

239—682, 685, 687; 184—6